US012331447B2

(12) United States Patent
Andre et al.

(10) Patent No.: US 12,331,447 B2
(45) Date of Patent: Jun. 17, 2025

(54) APPLIANCE FOR DRYING AND/OR WASHING LAUNDRY EQUIPPED WITH AN AUTONOMOUS FIRE EXTINGUISHING SYSTEM

(71) Applicants: HUTCHINSON, Paris (FR); Florence Andre, Chateau-Renard (FR)

(72) Inventors: Maxime Andre; Eric Bossard, La Selle en Hermoy (FR); Olivier Hiesse, Saint Avertin (FR)

(73) Assignee: HUTCHINSON, Paris (FR)

( * ) Notice: Subject to any disclaimer, the term of this patent is extended or adjusted under 35 U.S.C. 154(b) by 374 days.

(21) Appl. No.: 17/999,040

(22) PCT Filed: Apr. 6, 2021

(86) PCT No.: PCT/EP2021/058936
§ 371 (c)(1),
(2) Date: Nov. 16, 2022

(87) PCT Pub. No.: WO2021/233605
PCT Pub. Date: Nov. 25, 2021

(65) Prior Publication Data

US 2023/0220603 A1 Jul. 13, 2023

(30) Foreign Application Priority Data

May 20, 2020 (FR) ....................................... 2005219

(51) Int. Cl.
*D06F 37/42* (2006.01)
*A62C 3/16* (2006.01)
(Continued)

(52) U.S. Cl.
CPC ................ *D06F 37/42* (2013.01); *A62C 3/16* (2013.01); *D06F 58/50* (2020.02); *D06F 2105/62* (2020.02)

(58) Field of Classification Search
CPC .......... D06F 37/42; D06F 58/20; D06F 58/50; A62C 3/00; A62C 3/16; A62C 35/10
See application file for complete search history.

(56) References Cited

U.S. PATENT DOCUMENTS 9,885,142 B2 2/2018 Stegerwald
2010/0175898 A1 7/2010 Steinicke

FOREIGN PATENT DOCUMENTS

DE 102011087607 A1 * 6/2013 ............. D06F 58/04
EP 2072659 A1 6/2009
(Continued)

OTHER PUBLICATIONS

Machine Translation of Venturelli, FR 2614209 A1, Oct. 1988. (Year: 1988).*
(Continued)

*Primary Examiner* — David G Cormier
(74) *Attorney, Agent, or Firm* — Merchant & Gould P.C.

(57) ABSTRACT

An appliance (10) for drying and/or washing laundry includes an autonomous fire extinction device (20). The fire extinction device has pipe (26) with an elongate shape and closed at both its longitudinal ends (26*x*). The pipe includes a fusible thermoplastic wall defining an internal space. The pipe is thermoformed to give it a particular shape in the unconstrained free state corresponding to its mounted position inside the enclosure (12). An extinguishing fluid (29) is inside the space, and is configured to be released by fusion of the pipe wall (26) under the effect of heat produced by a fire or an incipient fire.

15 Claims, 11 Drawing Sheets

(51) Int. Cl.

| | |
|---|---|
| ***D06F 58/50*** | (2020.01) |
| *D06F 105/62* | (2020.01) |

(56) References Cited

FOREIGN PATENT DOCUMENTS

| | | | |
|---|---|---|---|
| FR | 2614209 | A1 | 10/1988 |
| FR | 3088215 | A1 | 5/2020 |

OTHER PUBLICATIONS

Machine Translation of Stegerwald, DE-102011087607-A1, Jun. 2013. (Year: 2013).*

International Search Report for PCT/EP2021/058936 (May 31, 2021).

* cited by examiner

APPLIANCE FOR DRYING AND/OR WASHING LAUNDRY EQUIPPED WITH AN AUTONOMOUS FIRE EXTINGUISHING SYSTEM

This application is a National Stage Application of PCT/EP2021/058936, filed Apr. 6, 2021, which claims benefit of Patent Application No. 2005219, filed May 20, 2020 in France, and which applications are incorporated herein by reference. To the extent appropriate, a claim of priority is made to each of the above-disclosed applications.

TECHNICAL FIELD OF THE INVENTION

The present invention concerns a laundry drying and/or washing appliance equipped with an autonomous fire or fire departure extinguishing system.

TECHNICAL BACKGROUND

The patent application FR-A1-2 614 209 describes a firefighting device for electrical appliance containing inflammable components and in particular for a washing machine or tumble dryer.

A laundry drying and/or washing appliance is a domestic appliance that comprises a rotating drum into which laundry is placed for washing with water and a cleaning agent, or wet laundry for drying it by stirring. The drum is usually driven in rotation by a belt driven by an electric motor. A washing machine can have a tumble dryer function. In both cases, the drum of the appliance can be passed through by a flow of hot air so as to facilitate the drying of the laundry while it is being stirred. The heating and hot air flow generation system of the appliance may comprise a gas burner or an electric heater for example.

This domestic appliance is the cause of many domestic fires. The heating and the stirring of the laundry in the drum generates inflammable dust which accumulates inside the appliance and is likely to become inflamed, in particular when deposited on very hot portions of the appliance such as the motor or the heating system. A fire departure caused by the inflammation of the dusts can lead to a larger fire in the appliance, in particular by inflammation of the drive belt of the drum.

The above-mentioned patent application proposes to install a tank in the form of a pressurised bomb in a washing machine, this tank being connected to normally closed pipelines that can rupture at a certain temperature threshold. These pipelines extend to portions of the appliance that are subject to undergo overheating or fire, such as electrical devices, resistors, motor, inflammable components, etc. The firefighting substance contained in the tank is at least slightly pressurised and the distribution pipelines are made of a material intended to fuse to ensure that the pipelines break or open when they are licked by flames or when the temperature of their environment exceeds a predetermined threshold. In this way, as soon as conditions of overheating or inflammability arise that could lead to a fire inside the appliance, the pipelines break and automatically distribute the firefighting substance to immediately extinguish the development of a possible fire.

However, the solution described in this patent application is not entirely satisfactory because the fire extinguishing system formed by the tank and the pipelines is complex and time-consuming to install in a domestic appliance. It comprises several elements that must be installed and attached one after the other and connected to each other in the appliance. These elements are located in several areas inside the appliance so that the installation of the system in the appliance can only be done when this appliance is manufactured. Similarly, in the event of maintenance, it is necessary to dismount several face panels of the appliance to gain access to the system. The system described in this application cannot therefore be easily integrated into an existing appliance that was not originally designed to be equipped with this system.

The present invention provides a solution to at least some of the above problems, which is simple, effective and economical, and at the same time allows a simple and quick integration into the specific environment of a laundry drying and/or washing appliance.

SUMMARY OF THE INVENTION

The invention proposes an appliance for drying and/or washing laundry, comprising:

- an external enclosure of generally parallelepipedic shape and comprising at least one first removable face panel,
- a drum located in said enclosure and rotatable about an axis, this drum comprising an internal cavity configured to receive laundry,
- a motor for driving in rotation the drum about its axis, this motor being located in the enclosure under the drum, and
- a system for heating and generating a flow of hot air through said cavity, this system being located in said enclosure, characterised in that it further comprises an autonomous fire extinguishing device, this device comprising:

- at least one pipe with an elongated shape and closed at both its longitudinal ends, this pipe comprising a fusible thermoplastic wall delimiting an internal space, this pipe being thermoformed in order to impose on it a particular shape in the unconstrained free state corresponding to its mounting position inside the enclosure, and
- a fire-extinguishing fluid within said space, this fire-extinguishing fluid being configured to be released by fusion of the wall of the pipe under the effect of the heat provided by a fire or a fire departure, and in that the device is configured to be mounted in said enclosure by dismounting and removing of said first face panel, the device comprising two portions, referred to as a first portion in the shape of cradle which extends between the drum and the motor, from said first face panel to a face panel of the enclosure opposite said first face panel and a second portion which extends on the side of said first face panel, said first portion being formed by a first segment of the pipe which forms a loop delimiting the periphery of said cradle, and said second portion being formed by a second segment of the pipe.

Firstly, it is important to note that the fluid, possibly under pressure, is stored directly in the pipe and therefore there is no independent tank connected to the pipe. The pipe has both ends sealed.

The pipe has an elongated shape and is made of a material that facilitates its shaping by heating (referred to as thermoforming), before being mounted in the appliance, as well as allowing the release of the fire-extinguishing fluid by fusion and bursting.

A special particularities of the device and the pipe is that it is specially designed and shaped for its integration into a laundry drying and/or washing appliance. It has a very small overall dimension. The pipe is arranged in two segments. A first segment of the pipe forms a cradle extending between the drum and the motor. A cradle is usually rounded or hollowed in shape, allowing it to extend around the drum and fit its shape. The pipe forms a loop which allows it to extend over the entire area between the motor and the drum, which is a critical area for fire development, without the risk of disrupting the operation of the appliance. The second segment of the pipe extends on the side of the removable face panel and for example along a portion of the drive belt of the drum.

One of the advantages of the device is that it can be easily installed in the appliance, from one face of it, by dismounting and removing the corresponding face panel which is removable. The general shape of the device imposed by the thermoforming of the pipe is its final shape. This shape facilitates the installation of the device in the appliance because, to mount the device, it is sufficient to interpose the cradle between the drum and the motor and then to attach the second segment of the pipe to the enclosure or to an element of the appliance.

For the purpose of this invention, a cradle is defined as a loop-shaped structure. The cradle (its structure or its loop) may extend in a plane or may define a planar surface. Alternatively, the cradle (its structure or its loop) may have a curved shape and define a curved surface. In yet another variant, the cradle (its structure or its loop) has a more complex shape or is even in at least two portions.

The appliance according to the invention may comprise one or more of the following characteristics, taken alone or in combination with each other:

- said first cradle portion extends in at least two intersecting planes;
- said first cradle portion extends in three intersecting planes, referred to as:
  - a horizontal intermediate plane in which straight and parallel sectors of the pipe are located,
  - a first inclined plane located on the side of said opposite face panel and extending upwards from said intermediate plane, and
  - a second inclined plane located on the side of said first face panel and extending upwards from said intermediate plane;
- the first inclined plane comprises a horizontal straight sector which is located above the straight sectors of the intermediate plane, and which is parallel to a horizontal straight sector of the second plane;
- the second segment of the pipe is generally L-shaped;
- the second segment of the pipe comprises a horizontal straight sector running alongside the horizontal straight sector of the second plane;
- the second segment of the pipe comprises a vertical straight sector;
- one of the longitudinal ends of the pipe is equipped with at least one sensor which is connected to a control member;
- said control member is accessible by a user via, for example, the control panel of that appliance or any other means of information exchange (e.g. Wifi, Bluetooth®, IR, etc.);
  - said control member is a control member of the appliance;
- the sensor is a pressure, temperature or one or more other parameters sensor;
- said member may be configured to put the appliance into a disable mode when said sensor emits a particular signal; for example, said member is configured to put the appliance in a disable mode when said pressure sensor emits a signal corresponding to a pressure of said fluid below a predetermined threshold;
- said member is configured to emit a signal to a portable electronic device, such as a portable computer or a portable telephone of the smartphone type for example;
- said member is configured to emit a signal to a computer network (for example home automation) or a computer database, such as a network or a database configured to ensure a management of a fleet of several appliance with a view to their maintenance;
- said signal emission is carried out wirelessly from a distance, for example by Wi-Fi, Bluetooth®, IR, etc.;
- the appliance further comprises a drive belt mounted around the drum or the drum pulley and a shaft of the motor, the first portion of the device extending between the belt and a face panel of the enclosure;
- said pipe has a length of between 1 and 5 m, and a diameter of between 10 and 30 mm;
  - the device is monobloc;
- the pipe is monobloc; alternatively, the pipe is formed of several consecutive sections which are assembled or not to each other, directly or by means of fluidic connectors;
  - the fluid is under pressure;
  - the fluid is at a pressure greater than 1 bar and less than or equal to 30 bar, preferably between 1 and 20 bar and for example between 1 and 10 bar;
- the fluid is in a liquid or gaseous state at room temperature (e.g. between 15 and 25° C.);
- the heating and hot air flow generation system is located under the drum or on one side of the drum;
- said cradle extends over said heating and hot air flow generating system;
- said second portion or segment of the pipe extends in the vicinity of said heating and hot air flow generating system.

The present invention also relates to a kit for an appliance as described above, characterised in that it comprises:

- an autonomous fire extinguishing device, this device comprising:
- at least one pipe of elongated shape and closed at both its longitudinal ends, this pipe comprising a fusible thermoplastic wall delimiting an internal space, this pipe being thermoformed in order to impose on it a particular shape in the free state without constraint corresponding to its mounting position inside the enclosure, and
- a fire-extinguishing fluid within said space, this fire-extinguishing fluid being configured to be released by fusion of the wall of the pipe under the effect of the heat provided by a fire or fire departure, the device being configured to be mounted in the enclosure of the appliance by dismounting and removing said first face panel, the device comprising two portions, referred to as a first portion in the shape of cradle which extends between the drum and the motor, from said first face panel to a face panel of the enclosure opposite said first face panel and a second portion which extends on the side of said first face panel, said first portion being formed by a first segment of the pipe which forms a loop delimiting the periphery of said cradle, and said second portion being formed by a second segment of the pipe, and attachments for attaching the device to the appliance.

BRIEF DESCRIPTION OF THE FIGURES

The invention will be better understood and other details, characteristics and advantages of the present invention will become clearer from the following description made by way of non-limiting example and with reference to the attached drawings, in which.

DETAILED DESCRIPTION OF THE INVENTION

Figure 1:
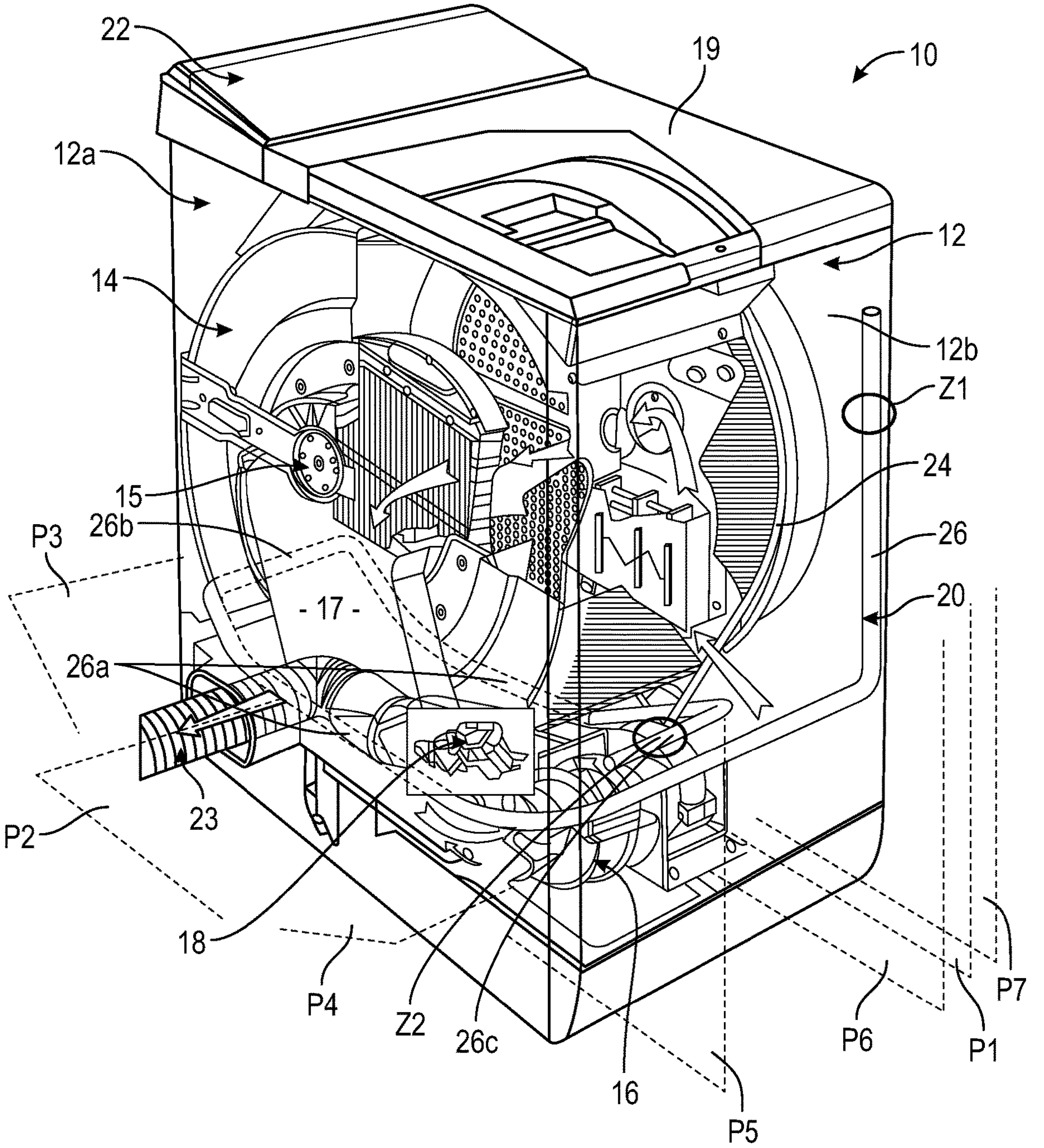
FIG. 1 is a schematic perspective and transparency view of a laundry drying and/or washing appliance according to the invention.

FIG. 1 schematically represents a laundry drying and/or washing appliance 10, such as a tumble dryer, i.e. a domestic appliance designed to dry laundry by stirring it and subjecting it to a flow of hot air. The appliance 10 may be intended for private or professional use The appliance 10 comprises a generally parallelepipedal external enclosure 12 in which are located:

- a drum 14 rotatable about an axis 15 and comprising an internal cavity 17 configured to receive the laundry,
- a motor 16 for driving in rotation the drum 14 about its axis 15, which is located under the drum 14,
- a system 18 for heating and generating a flow of hot air through said cavity, and
- an autonomous fire extinguishing device 20.

The enclosure 12 comprises several face panels 12*a*, 12*b*, some of which are removable. In a known manner, such an appliance 10 may comprise a top or front loading hatch 19. Where the appliance comprises a top loading hatch, the appliance comprises face panels, in number of 4 (front, rear and lateral), at least some of which are removable to provide access, after dismounting and removing of at least one of these panels, to the interior of the enclosure and of the appliance. Where the appliance comprises a front loading hatch, for example in the shape of porthole, the appliance comprises face panels of which at least one lateral panel is removable for the same reason.

The drum 14 defines any washing and/or drying volume and is adapted to its use (private or professional).

As can be seen in FIG. 1, the appliance 10 comprises other elements such as in particular an electronic member 22 for monitoring and controlling the various electrical equipment of the appliance, a condenser or a conduit 23 for evacuating hot air loaded with humidity, etc.

The motor 16 comprises an output shaft (not visible) which drive in rotation the drum 14 about its axis 15 by means of a belt 24. The belt 24 extends around the drum 14 and the output shaft of the motor 16, or a pulley driven by that shaft, and extends generally in a substantially horizontal plane P1. In the example shown, the plane P1 is parallel to the lateral face panels 12*a* of the appliance 10. The axis of rotation of the drum 14 is also horizontal and perpendicular to these panels 12*a*. In the case of an appliance with a front opening porthole hatch, the plane P1 would extend parallel to the rear face panel of the appliance and the axis of rotation of the drum would be perpendicular to this rear panel.

The heating system 18 may be of any type and is for example of the resistance heating type, gas burner type, etc. The system 18 may be located under the drum 14 or on one side of the drum 14.

The fire extinguishing device 20 is specifically designed to be integrated into the appliance 10 and comprises an elongated pipe 26 closed at both longitudinal ends.

The ends of the pipe 26 can be closed by means of plugs which are fitted and attached to the pipe, for example by gluing or welding. Alternatively, the ends of the pipe 26 could be directly closed by deforming and welding its material.

Figure 4:
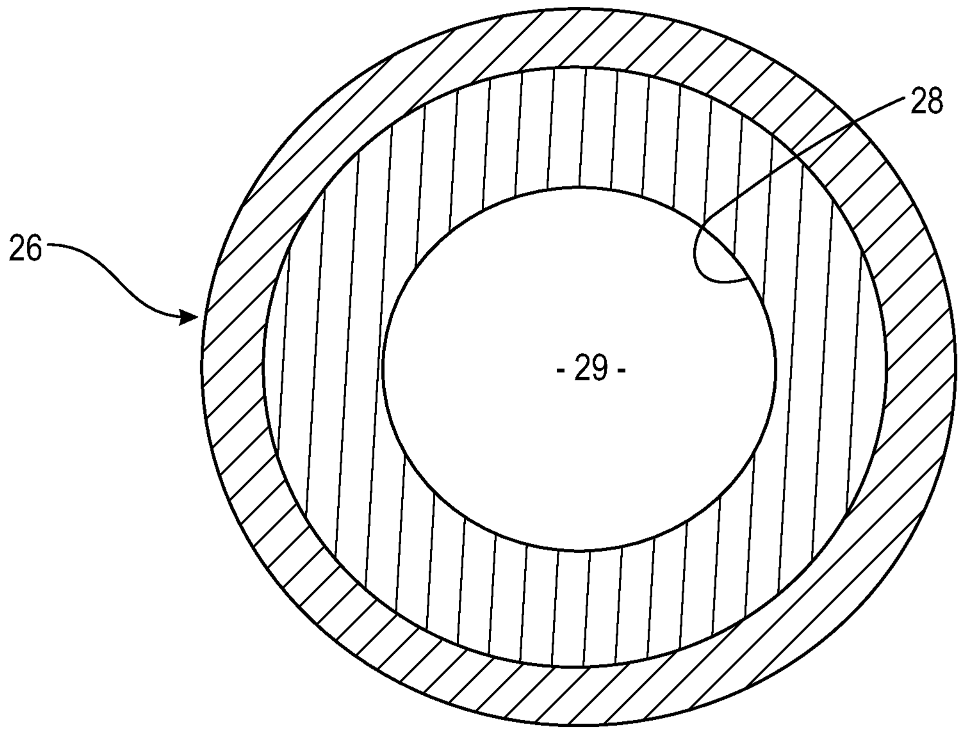
FIG. 4 is a schematic cross-sectional view of the fire extinguishing device and in particular of its pipe.
Figure 5:
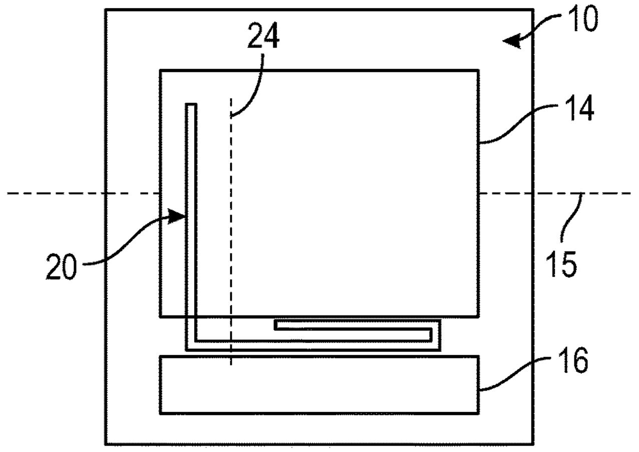
FIGS. 5 to 25 illustrate several variants of installation of a fire extinguishing device in an appliance according to the invention.
Figure 6:
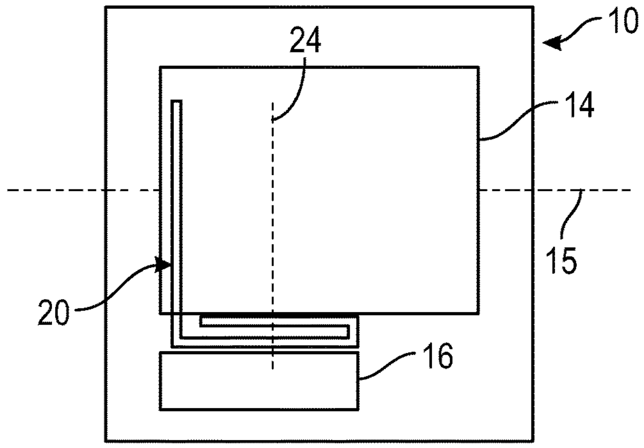
Figure 7:
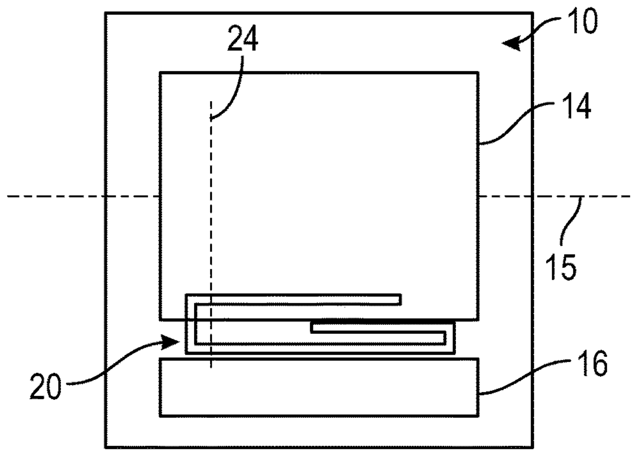
Figure 8:
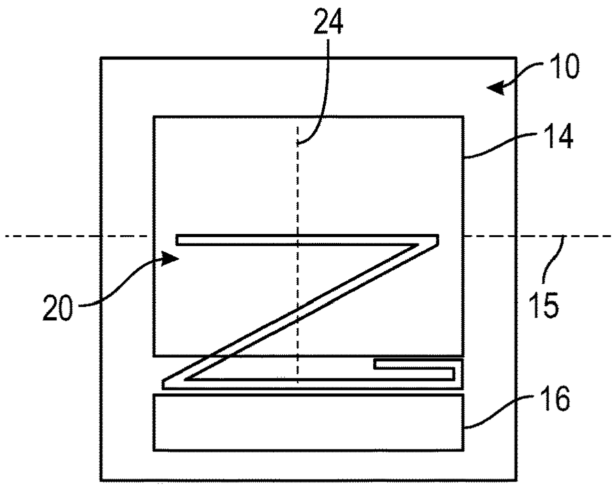
Figure 9:
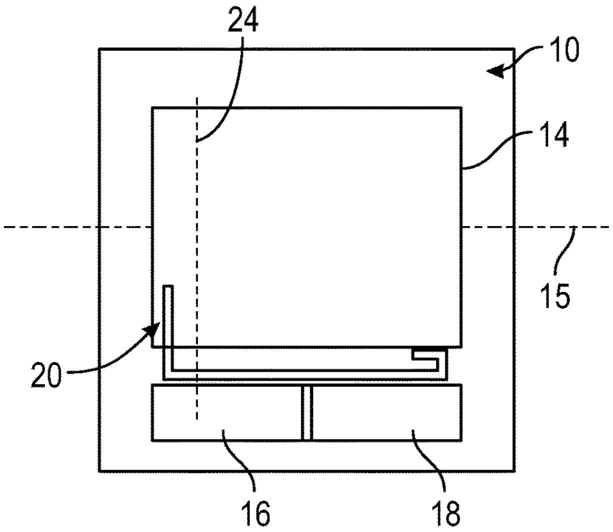
Figure 10:
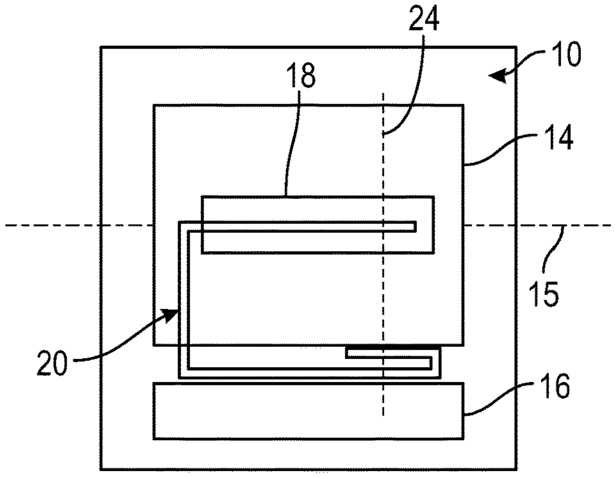
Figure 11:
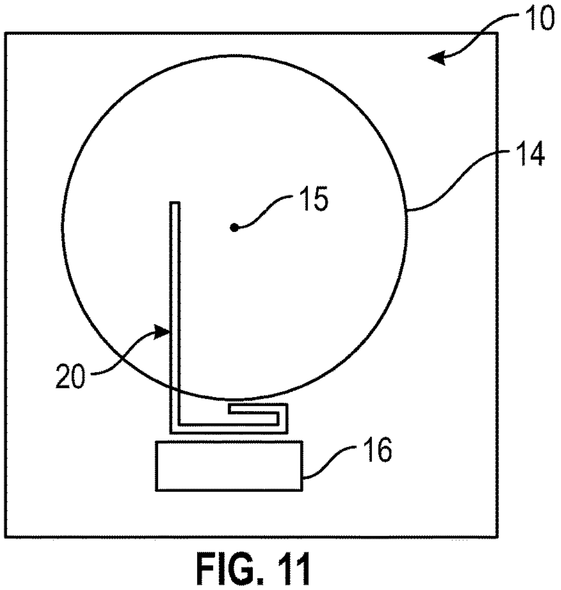
Figure 12:
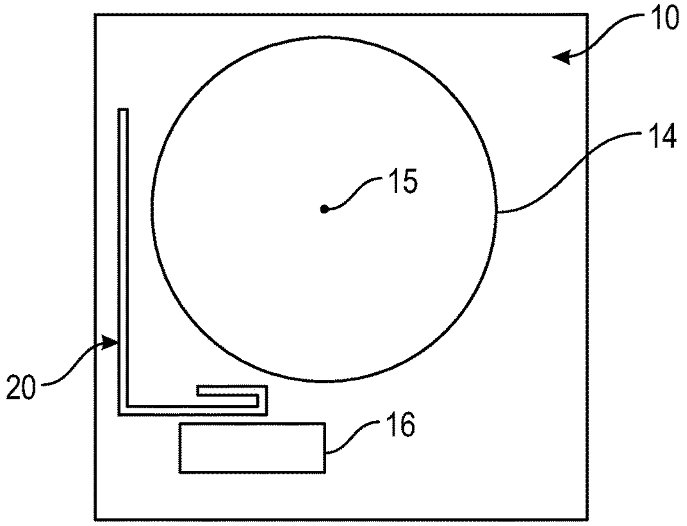
Figure 13:
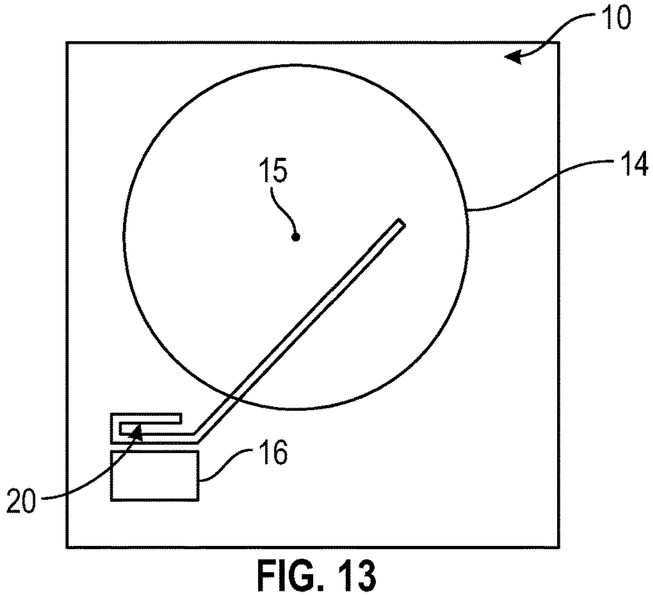
Figure 14:
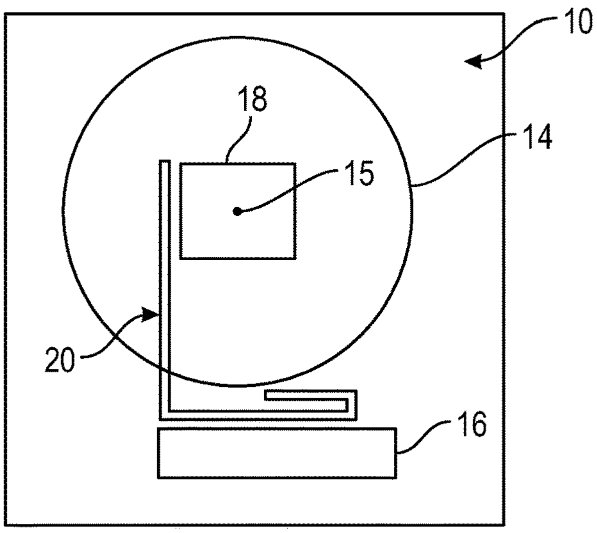
Figure 15:
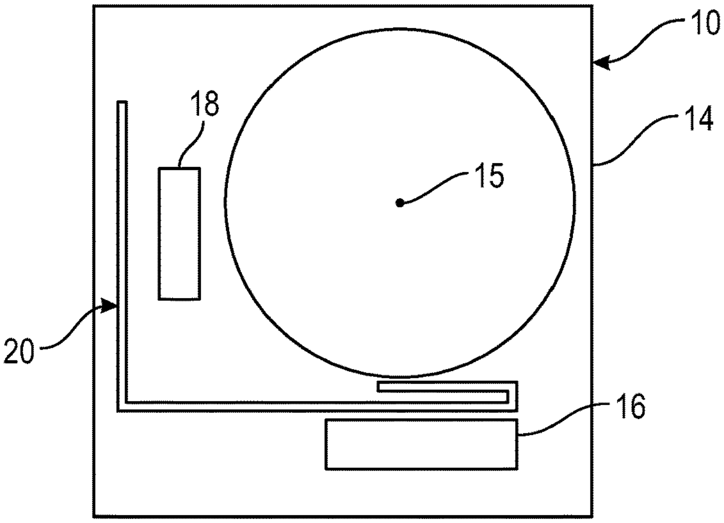
Figure 16:
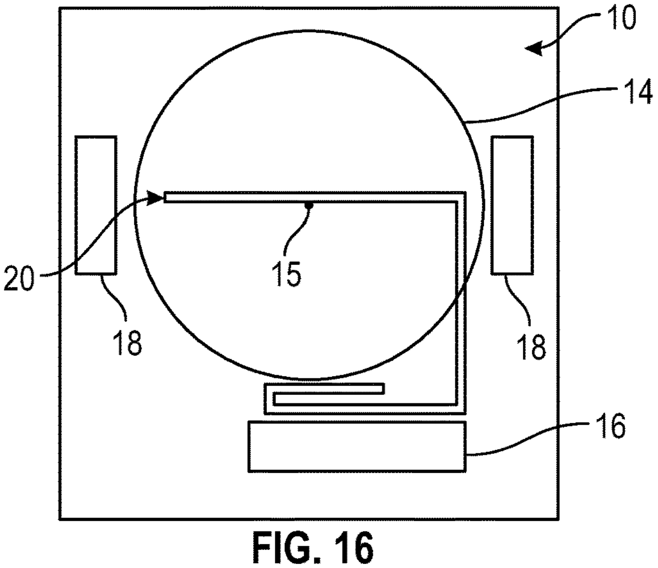
Figure 17:
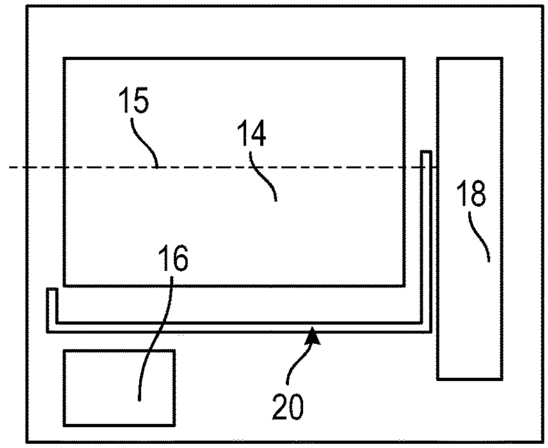
Figure 18:
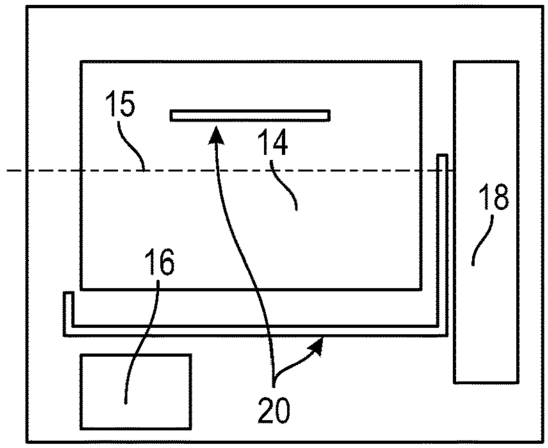
Figure 19:
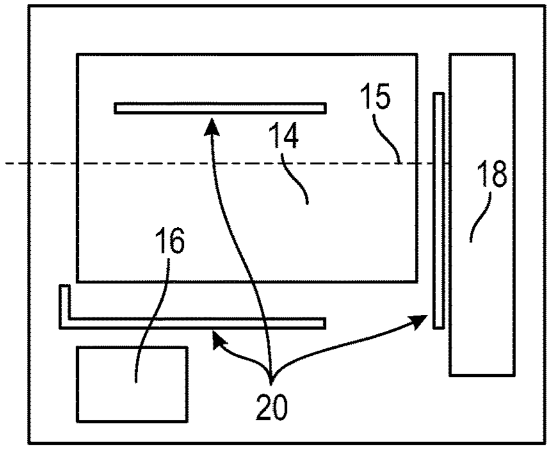
Figure 20:
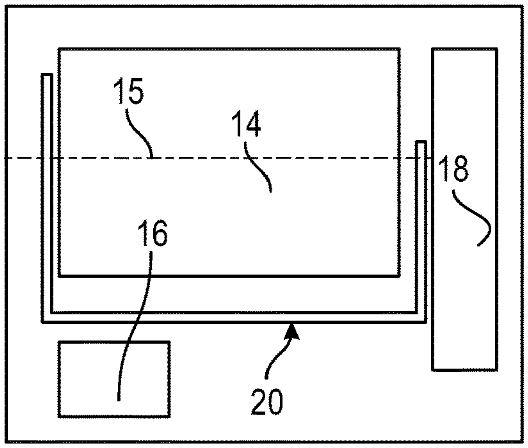
Figure 21:
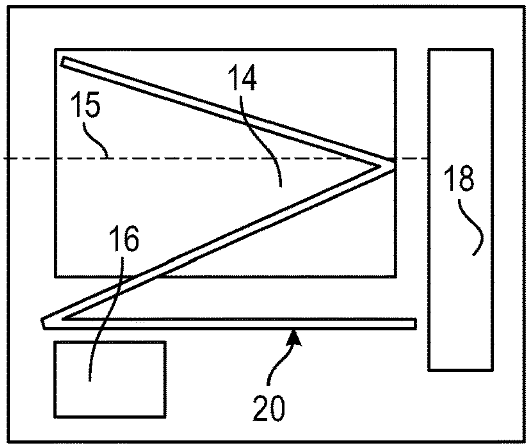
Figure 22:
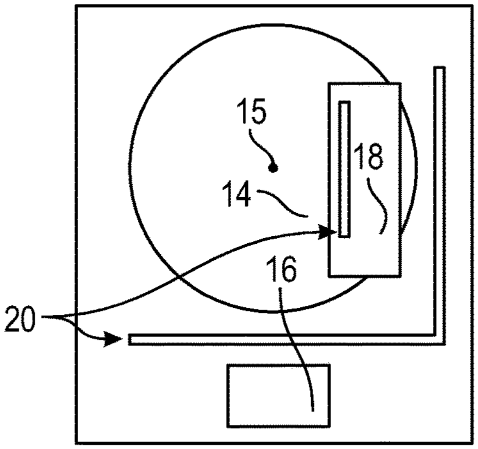
Figure 23:
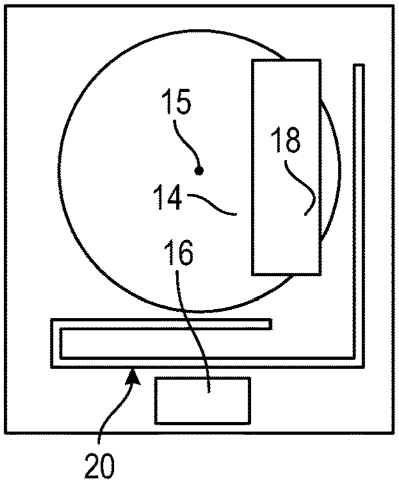
Figure 24:
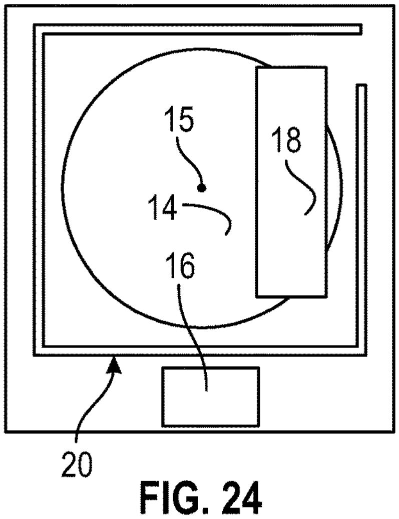
Figure 25:
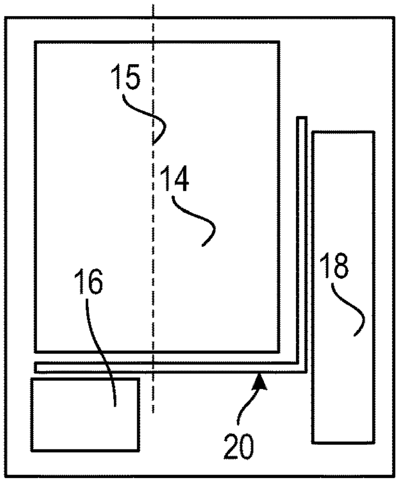

The pipe 26 comprises a fusible thermoplastic wall delimiting an internal space 28 in which a fire-extinguishing fluid 29 is stored, possibly under pressure (see FIG. 4). For example, this wall is generally circular in cross-section. Alternatively, the wall of the pipe, in whole or in part, could have another cross-sectional shape, for example square, rectangular, oval, etc.

At least one of the ends of the pipe 26 could be equipped with a valve for filling the pipe with fire-extinguishing fluid 29, as described in the application FR-A1-3 088 215.

The fire-extinguishing fluid 29 is configured to be released by fusion of the wall of the pipe under the effect of heat from a fire or fire departure, The pipe 26 is thermoformed to impose a particular shape on it in the unstressed free state corresponding to its mounting position within the enclosure 12. The material of the pipe will be described in more detail in the following with reference to FIG. 4.

Figure 2:
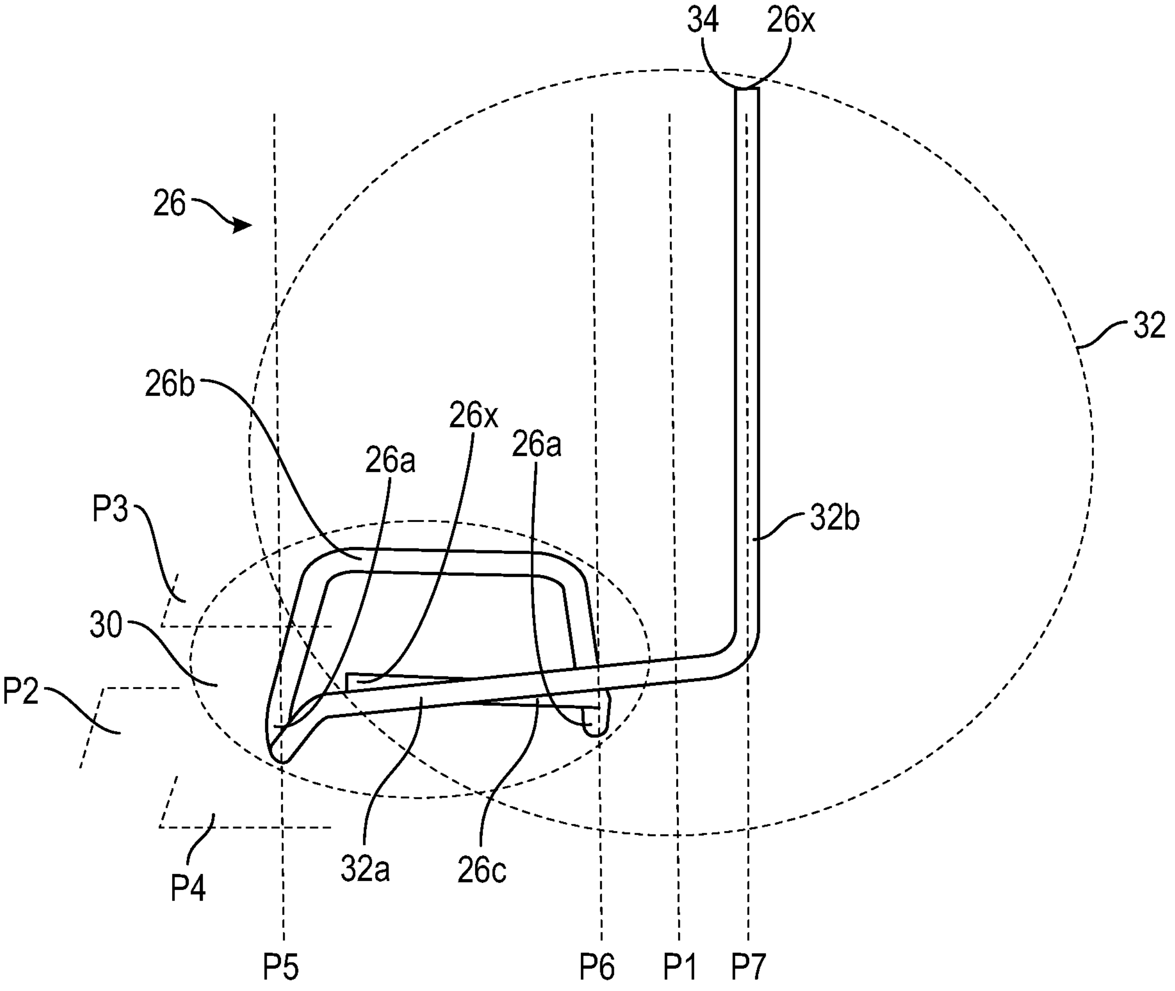
FIG. 2 is a schematic perspective view of the fire extinguishing device to be installed in the appliance of FIG. 1.
Figure 3:
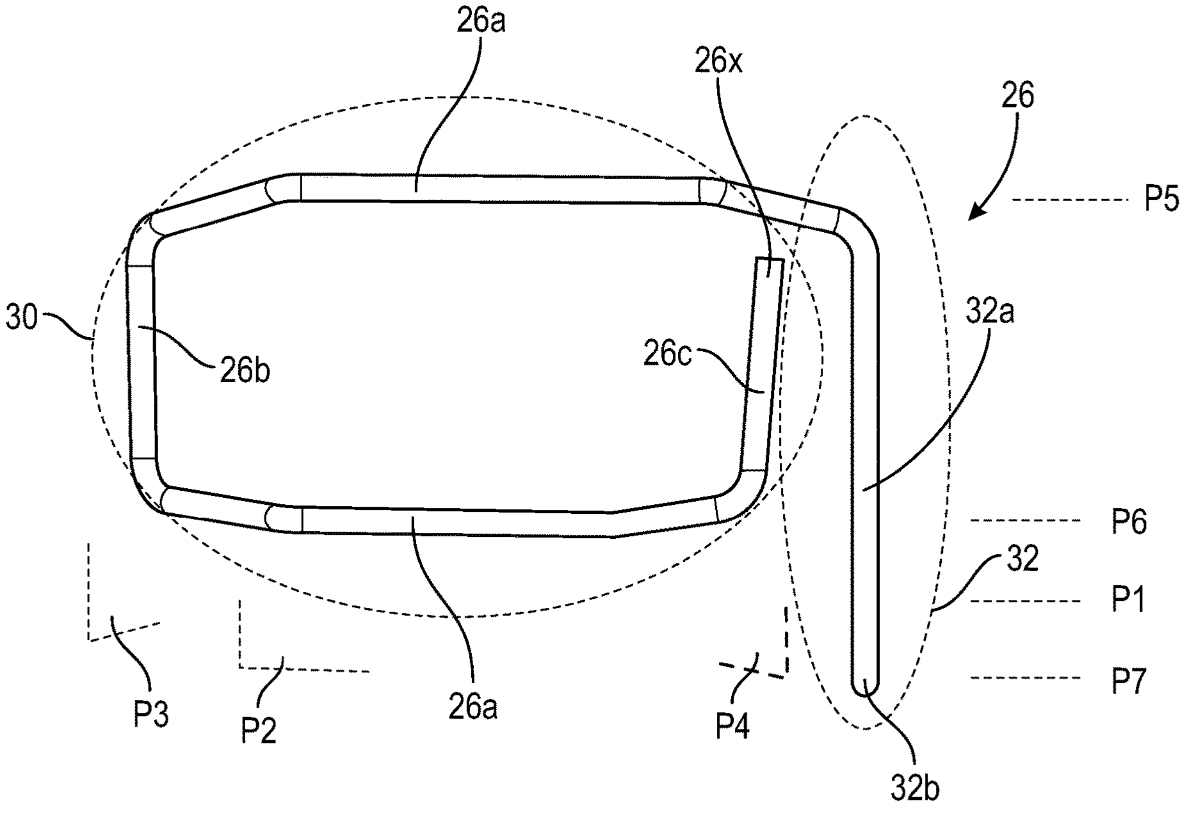
FIG. 3 is another schematic perspective view of the system in FIG. 2.

The device 20 essentially comprises two portions best seen in FIGS. 2 and 3, referred to as a first portion 30 shaped like a cradle which extends between the drum 14 and the motor 16, and a second portion 32 which extends on the side of one of the removable panels, here the front panel 12*b*. The first portion is formed by a first segment of the pipe 26 which forms a loop delimiting the periphery of the cradle 30, and the second portion is formed by a second segment of the pipe.

The device 20 is configured to be mounted in the enclosure 12 by dismounting and removing one of the removable face panels, referred to as the front panel 12*b* in the example shown.

The second segment 32 of the pipe 26 is located on the side of the panel 12*b* to facilitate the installation and the attachment of the device 20 in the appliance. The cradle 30 extends from this panel 12*b* to the opposite face panel, in this case the rear panel.

It is understood that the dismounting and the removal of the panel 12*b* is sufficient to gain access to the device 20 and, more importantly, is sufficient to mount and attach this device in the enclosure 12. The cradle shape of the first segment of the pipe 26 facilitates its insertion around the drum 14, and between this drum 14 and the motor 16.

FIGS. 1 to 3 show a preferred example of embodiment of the device 20.

The cradle 30 extends in three intersecting planes, P2, P3 and P4 respectively:

- P2 is a horizontal intermediate plane in which straight and parallel sectors 26*a* of the pipe are located,
- P3 is a first inclined plane on the side of the rear panel and extending upwards from the intermediate plane P2, and
- P4 is a second inclined plane located on the side of the front panel 12*b* and extending upwards from the intermediate plane P2.

P3 comprises a horizontal straight sector 36*b* which is located above the sectors 26*a* of the intermediate plane, and which is parallel to a horizontal straight sector 26*c* of the second plane P4.

The second segment 32 of the pipe is generally L-shaped. It comprises a horizontal straight sector 32*a* running along the sector 26*c* of the second plane P3. This second segment 32 further comprises a vertical straight sector 32*b*.

It can be seen that the sectors 26*a*, 32*b* extend respectively in vertical planes P5, P6 and P7 parallel to each other and to the aforementioned plane P1. P1 is located here between P6 and P7. In other words, the cradle 30 has a width measured in the plane P2, between the sectors 26*a*, which is less than the width of the second segment 32. The width of this segment 32 corresponds substantially to the length of the sector 32*a* of this segment.

It can be seen that the two free ends 26*x* of the pipe 26 are carried by the sector 26*c* and the sector 32*b* respectively.

The pipe 26 may be attached to an element of the appliance 10 at two locations, for example in the area Z1 on the inside of a face panel of the enclosure 12, and in the area Z2 on a plastic casing located inside the enclosure (for example that surrounding the motor 16 or a fan). The attachment can be done by means of plastic members.

One of these ends 26*x* of the pipe 26 is preferably equipped with a pressure sensor 34 which is configured to measure the pressure of the fluid 29 and which is connected to the monitoring and controlling member 22 of the appliance 10.

The member 22 is configured to put the appliance 10 into a disable mode when the pressure sensor 34 emits a signal corresponding to a pressure of the fluid 29 below a predetermined threshold. The member 22 may further be configured to emit a signal to a portable electronic device such as a mobile phone of the smartphone type, in order to warn the user or the owner of the appliance in case of malfunction of the latter.

Alternatively, the pipe 14 could be equipped with a sensor to measure other parameters than pressure, such as temperature for example.

As schematically shown in FIG. 4, the wall of the pipe 26 may be of the single or multi-layer type. For example, it may comprise two layers, internal and external respectively.

The internal layer may be made of a material with a low permeability with respect to the fire-extinguishing fluid 29, i.e. with a permeability of less than or equal to 1 $cm^3 \cdot 25\ \mu m/m^2 \cdot atm \cdot 24$ h. For example, it is made of fluorinated thermoplastic material or EVOH.

The external layer is made of a thermoplastic polyamide material, which generally has a permeability greater than that of the internal layer, and for example greater than or equal to 1 $cm^3 \cdot 25\ \mu m/m^2 \cdot atm \cdot 24$ h.

It is preferable that the lower permeability layer is located within the higher permeability layer. Otherwise, there would be a risk of migration for the gas through the more permeable internal layer and stagnation of this gas at the interface between the two layers, which could lead to a delamination of the layers.

It is also advantageous to make the pipe in two layers rather than a single layer of low-permeability material, as this material is relatively expensive. In order to have a sufficient strength, in particular under pressure, a single-layer pipe should have a high thickness of low permeability layer. In the case of a two or multi-layer pipe, this strength is provided by the higher permeability layer or layers, and the lower permeability layer may be relatively thin enough to ensure the required impermeability function.

In another variant not shown, the layer could be arranged between two layers. This configuration would allow to improve the mechanical strength of the layer during the step of forming the pipe (and thus avoid any risk of tearing of this layer), while guaranteeing an optimal sealing of the pipe.

At least one of the wall materials has a fusible property under the effect of the heat generated by a fire or a fire departure, and in particular under the effect of a temperature greater than or equal to 70° C., or even 120° C.

In the example described above, both layers have such a fusible property.

In a particular embodiment of the invention, the pipe 26 has an external diameter of between 10 and 30 mm, and preferably between 10 and 20 mm. The wall thickness is between 1 and 3 mm, preferably between 1 and 2 mm. The length of the pipe 26 is for example between 1 and 5 m The fire-extinguishing fluid can be stored in the aforementioned space or cavity at a pressure of more than 1 bar and up to 10 bar, 20 bar or even 30 bar.

The fire-extinguishing fluid preferably does not comprise HFC gas of the type R236Fa because this gas has a very high PWP or GWP of around 9400.

The fire-extinguishing fluid preferably has a PWP or GWP of 5000 or less. The fluid may comprise at least one gas HFC and/or $C_6F_{12}O$, and/or $CO_2$. Among the gases HFC that can be used, the gases R227ea and R125 are preferred as they have a PWP or GWP of around 3400-3500. For example, DuPont® markets gases of this type under the names FE-25 and FM-200.

$CO_2$ is advantageous because it has a PWP or GWP of 1.

Finally, $C_6F_{12}O$ is also advantageous because it has a PWP or GWP of 1. The company 3M in particular markets this type of gas under the name Novec® 1230 (FK-5-1-12).

FIGS. 5 to 25 illustrate different variants showing several configurations for the appliance 10 and several possible installations and conformations for the device 20 and the pipe 16.

The elements already described in the foregoing and illustrated in the drawings are designated by the same references.

In FIGS. 5 to 10, 17 to 21, and 25, the axis 15 of rotation of the drum 14 extends in the plane of the drawings. This axis is horizontal in FIGS. 5 to 10, 17 to 21, and vertical in FIG. 25. In FIGS. 11 to 16, and 22 to 24, this axis 15 is perpendicular to the plane of the drawings.

It can be seen that the motor 16 and the heating system 18 can have different dimensions and positions in the enclosure of the appliance 10. This is also the case for the belt 24.

It is also noted that the shape, the dimensions, and the position of each of the portions of the pipe 14 can be adapted to the dimensions and positions of the motor 16, and/or the system 18 and/or the belt 24. It can also be seen from FIGS. 18, 19 and 22 that the device 20 may comprise a plurality of pipes 26 or a pipe 26 formed from a plurality of segments, sectors or sections which are consecutive or disjoint from each other.

The present invention also relates to a kit which comprises a device 20 as described above and attachments, such as the aforementioned plastic members, to allow the device 20 and in particular its pipe 26 to be mounted and attached in an appliance 10. This kit can therefore be considered as a transformation kit of a new or old appliance in order to equip it with an autonomous fire extinguishing device.

The invention claimed is:

1. An appliance for drying and/or washing laundry, comprising:

an external enclosure of generally parallelepipedic shape and comprising at least one first removable face panel, a drum located in said enclosure and rotatable about an axis, the drum comprising an internal cavity configured to receive laundry, a motor for driving in rotation the drum about the axis, the motor being located in the enclosure under the drum, and a system for heating and generating a flow of hot air through said cavity, the system being located in said enclosure, an autonomous fire extinguishing device comprising:

at least one pipe with an elongate shape and closed at both longitudinal ends, the pipe comprising a fusible thermoplastic wall delimiting an internal space, the pipe being thermoformed in order to impose on the pipe a particular shape in an unstressed free state corresponding to a mounting position inside the enclosure, and a fire-extinguishing fluid within said space, the fire-extinguishing fluid being configured to be released by fusion of the wall of the pipe under an effect of heat provided by a fire or a fire departure, wherein the device is configured to be mounted in said enclosure by dismounting and removing said first face panel, the device comprising two portions, comprising a first portion in the shape of a cradle which extends between the drum and the motor, from said first face panel to a face panel of the enclosure opposite said first face panel, and a second portion which extends on a side of said first face panel, said first portion being formed by a first segment of the pipe which forms a loop delimiting a periphery of said first portion, and said second portion being formed by a second segment of the pipe.

2. The appliance of claim 1, wherein said first portion extends in at least two intersecting planes.

3. The appliance according to claim 2, wherein said first portion extends in three intersecting planes, comprising:

a horizontal intermediate plane in which straight and parallel sectors of the pipe are located, a first inclined plane located on a side of said opposite face panel and extending upwards from said intermediate plane, and a second inclined plane located on the side of said first face panel and extending upwards from said intermediate plane.

4. The appliance according to claim 3, wherein the first inclined plane comprises a horizontal straight sector which is located above the straight sectors of the intermediate plane, and which is parallel to a horizontal straight sector of the second plane.

5. The appliance according to claim 1, wherein the second segment of the pipe is generally L-shaped.

6. The appliance according to claim 4, wherein the second segment of the pipe is generally L-shaped, and wherein the second segment of the pipe comprises a horizontal straight sector running alongside the horizontal straight sector of the second plane.

7. The appliance according to claim 1, wherein the second segment of the pipe comprises a vertical straight sector.

8. The appliance according to claim 1, wherein one of the longitudinal ends of the pipe is equipped with at least one sensor which is connected to a control member.

9. The appliance according to claim 8, wherein said control member is configured to put the appliance into a disable mode when said at least one sensor emits a signal.

10. The appliance according to claim 8, wherein said at least one sensor is a pressure sensor, temperature sensor, or other parameter sensor.

11. The appliance according to claim 8, wherein said control member is configured to emit a signal to an electronic device, a computer network, or a computer database.

12. The appliance according to claim 1, further comprising a drive belt mounted around the drum and a motor shaft, the first portion of the device extending between the belt and a face panel of the enclosure.

13. The appliance according to claim 1, wherein said pipe has a length between 1 and 5m, and a diameter between 10 and 30 mm.

14. The appliance according to claim 1, wherein said system for heating and generating a flow of hot air is located under the drum or on one side of the drum.

15. A kit for an appliance, comprising:

an external enclosure of generally parallelepipedic shape and comprising at least one first removable face panel, a drum located in said enclosure and rotatable about an axis, the drum comprising an internal cavity configured to receive laundry, a motor for driving in rotation the drum about the axis, the motor being located in the enclosure under the drum, a system for heating and generating a flow of hot air through said cavity, the system being located in said enclosure, an autonomous fire extinguishing device comprising:

at least one pipe of elongated shape and closed at both longitudinal ends, the pipe comprising a fusible thermoplastic wall delimiting an internal space, the pipe being thermoformed in order to impose on the pipe a particular shape in an unstressed free state corresponding to a mounting position inside the enclosure, and a fire-extinguishing fluid within said space, the fire-extinguishing fluid being configured to be released by fusion of the wall of the pipe under an effect of heat provided by a fire or a fire departure, the device being configured to be mounted in the enclosure of the appliance by dismounting and removing said first face panel, the device comprising two portions, comprising a first portion in the shape of a cradle which extends between the drum and the motor, from said first face panel to a face panel of the enclosure opposite said first face panel and a second portion-which extends on a side of said first face panel, said first portion being formed by a first segment of the pipe which forms a loop delimiting the periphery of said cradle, and said second portion being formed by a second segment of the pipe, and attachments for attaching the device to the appliance.

* * * * *